United States Patent [19]

Olson et al.

[11] Patent Number: 4,788,361

[45] Date of Patent: Nov. 29, 1988

[54] POLYMERIC VISCOSITY INDEX IMPROVER AND OIL COMPOSITION COMPRISING THE SAME

[75] Inventors: Danford H. Olson, Cypress; Dale L. Handlin, Houston, both of Tex.

[73] Assignee: Shell Oil Company, Houston, Tex.

[21] Appl. No.: 115,683

[22] Filed: Oct. 30, 1987

[51] Int. Cl.$^4$ ................ C10M 107/00; C10M 119/02
[52] U.S. Cl. .......................................... 585/10; 585/7; 585/9; 585/12; 585/17; 585/18
[58] Field of Search .................... 585/7, 9, 12, 17, 18, 585/19, 10, 11

[56] References Cited

U.S. PATENT DOCUMENTS

| 3,231,635 | 10/1963 | Holden et al. | 260/880 |
|---|---|---|---|
| 3,265,765 | 8/1966 | Holden et al. | 260/876 |
| 3,322,856 | 11/1963 | Holden et al. | 260/876 |
| 3,554,911 | 1/1971 | Schiff et al. | 252/59 |
| 3,668,125 | 6/1972 | Anderson | 252/59 |
| 3,700,633 | 10/1972 | Wald et al. | 260/880 B |
| 3,772,196 | 11/1973 | St. Clair | 252/32.7 |
| 3,775,329 | 11/1927 | Eckert | 252/59 |
| 3,835,053 | 9/1974 | Meier et al. | 252/59 |
| 3,835,083 | 9/1974 | Tinkelenberg | 260/29.4 |
| 3,894,119 | 7/1975 | Forbes et al. | 585/12 |
| 4,073,737 | 2/1978 | Elliott | 585/12 |
| 4,081,390 | 3/1978 | Richardson | 585/11 |
| 4,116,917 | 9/1978 | Eckert | 260/33.6 |
| 4,141,847 | 2/1979 | Kiovsky | 252/51.5 |
| 4,156,673 | 5/1979 | Eckert | 252/51.5 |
| 4,162,985 | 7/1970 | Holubec | 252/32.7 |
| 4,418,234 | 11/1983 | Schiff et al. | 585/12 |

FOREIGN PATENT DOCUMENTS

| 2258966 | 6/1973 | Fed. Rep. of Germany | 585/12 |
|---|---|---|---|
| 1030306 | 4/1964 | United Kingdom . | |

Primary Examiner—Asok Pal

[57] ABSTRACT

A triblock copolymer VI improver comprising terminal hydrogenated polyisoprene blocks and a central polymeric block containing predominantly monoalkenyl aromatic hydrocarbon monomer units. Oil compositions comprising such triblock copolymer VI improvers exhibit a good balance between thickening efficiency and mechanical shear stability combined with relatively high HTHSR viscosities.

5 Claims, No Drawings

POLYMERIC VISCOSITY INDEX IMPROVER AND OIL COMPOSITION COMPRISING THE SAME

BACKGROUND OF THE INVENTION

1. Field of the Invention

This invention relates to a polymeric additive which, when added to an oil will increase its viscosity, particularly at higher temperatures, and to oil compositions comprising said polymeric additive. More particularly, this invention relates to a polymeric additive of the triblock variety and to lubricating oil compositions comprising the same.

2. Prior Art

As is well known, the viscosities of lubricating oils vary with temperature and, since lubricating oils generally incur a relatively broad temperature range during use, it is important that the oil not be too viscous (thick) at low temperatures nor too fluid (thin) at higher temperatures. As is also well known, variation in the viscosity-temperature relationship of an oil is indicated by the so-called viscosity index (VI). The higher the viscosity index, the less the change in viscosity with temperature. In general, the viscosity index is a function of the oils viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature specified in the test is 100° C.

Heretofore, several methods have been proposed for improving the rheological properties of lubricating oil compositions. Generally, these methods involve the use of one or more polymeric additives. Such methods wherein the polymeric additive is a linear or branched chain polymer are taught, for example, in U.S. Pat. Nos. 3,554,911; 3,668,125; 3,772,196; 3,775,329 and 3,835,053. The polymeric additives taught in this series of U.S. patents are, generally, hydrogenated, substantially linear polymers of conjugated dienes which may, optionally, also contain monomeric units of a monoalkenyl aromatic hydrocarbon. Polymers of the type disclosed in this series of U.S. patents are typically prepared via the anionic solution polymerization of the monomers followed by hydrogenation. The polymers may be random, tapered or block. The process for preparing the polymers involves polymerizing a conjugated diene and, optionally, a monoalkenyl aromatic hydrocarbon in solution and in the presence of an anionic initiator to form an unsaturated, so-called living polymer. The polymeric product is, thereafter, selectively hydrogenated so as to eliminate a significant portion of the ethylenic unsaturation in the polymer after its preparation. A selectively hydrogenated block copolymer comprising a single polystyrene block and a single hydrogenated isoprene polymer block, which block copolymer is within the scope of the teaching of U.S. Pat. No. 3,772,196, is available commercially and is commonly used as a VI improver. The VI improvers taught in U.S. Pat. No. 3,775,329 are tapered copolymers which may be coupled. The coupled polymers may, of course, approach a triblock copolymer but such copolymers will comprise two segments which are, in effect, copolymer blocks. These copolymer blocks will, of course, reduce the effectiveness of the tapered copolymers as VI improvers.

More recently, it has been discovered that certain so-called star-shaped polymers, such as those disclosed in U.S. Pat. Nos. 4,116,917 and 4,156,673 can be effectively used as VI improvers in lubricating oil compositions. The polymeric additives taught in these patents are, generally, hydrogenated star-shaped polymers wherein the arms are either homopolymers or copolymers of conjugated dienes or copolymers of one or more conjugated dienes and one or more monoalkenyl aromatic hydrocarbons or a mixture of such arms. The hydrogenated star-shaped polymers may be prepared by first polymerizing the arms, then coupling the arms with a suitable coupling agent and thereafter hydrogenating the star-shaped polymer product. A star-shaped polymer wherein all of the arms are homopolymers of isoprene, which star-shaped polymer is within the scope of the teaching of both U.S. Pat. Nos. 4,116,917 and 4,141,847, is commercially available and is commonly used as a VI improver.

As is further well known in the prior art, thickening efficiency of the polymeric additive is an important, and frequently the principal, consideration in its selection for use as a VI improver. Particularly, polymeric additives which significantly increase the high temperature kinematic viscosity without significantly increasing the low temperature kinematic viscosity are sought. In general, the thickening efficiency of any given polymeric additive will vary with polymer composition and structure but will, generally, increase with increased molecular weight. The ability of the polymeric additive to maintain an increase in viscosity after the same has been subjected to mechanical shear is also an important consideration in the selection of a polymeric additive for use as a VI improver. In general, lower molecular weight polymeric additives exhibit better mechanical shear stability than do the high molecular weight polymeric additives. Improved mechanical shear stability is, then, generally achieved at the expense of thickening efficiency although additional polymer may be used to offset any loss of thickening efficiency.

Another property which is frequently considered in the selection of a particular polymeric additive for use as a viscosity index improver is the high temperature, high shear rate (HTHSR) viscosity of the oil blend comprising the polymeric viscosity index improver. Heretofore, higher HTHSR viscosities were, generally, sought, although, as a practical matter, the HTHSR viscosity value associated with the desired balance of thickening efficiency and mechanical shear stability was generally accepted. In general these HTHSR viscosity values have been relatively high but, generally, not as high as may be required to insure the maintenance of a relatively thick layer of oil in many areas of application.

As is still further known in the prior art, linear diblock copolymers comprising a single polystyrene block and a single polyisoprene block, such as taught in U.S. Pat. No. 3,772,196, can be prepared having relative thickening efficiencies and permanent shear stabilities ranging from a good thickening efficiency but poor permanent shear stability to poor thickening efficiency but good mechanical shear stability. Molecular weight of the copolymer is, of course, the principle controlling variable. The diblock copolymers generally have low HTHSR viscosity values, however, at all molecular weights. Star-shaped polymers having a plurality of polyisoprene arms, such as taught in U.S. Pat. Nos. 4,116,917 and 4,156,673, on the other hand, offer improved mechanical shear stability and, generally, offer higher HTHSR viscosities values but have poor thickening efficiencies. Neither of these type polymers is, then, well suited for use as a VI improver in applications where good thickening efficiency, good mechanical shear stability and a high HTHSR viscosity is required or at least is desirable. The need, then, for an improved polymeric VI improver which will provide a good balance between thickening efficiency and mechanical shear stability while at the same time affording higher HTHSR viscosity values is believed to be readily apparent.

SUMMARY OF THE INVENTION

It has now been discovered that the aforementioned deficiencies of the prior art VI improvers can be offset with the VI improvers of the present invention and improved lubricating oil compositions prepared therewith. It is, therefore, an object of this invention to provide improved polymeric VI improvers. It is another object of this invention to provide an improved lubricating oil compositions comprising said VI improvers. It is still another object of this invention to provide polymeric VI improvers having good thickening efficiency which can be used to produce multigrade lubricating oil compositions having better mechanical shear stabilities and higher HTHSR viscosities. The foregoing and still other objects and advantages of the present invention will become apparent from the description set forth hereinafter and the examples included herein.

In accordance with the present invention, the foregoing and other objects and advantages are accomplished with a selectively hydrogenated triblock polymeric VI improver comprising two terminal polymeric blocks containing predominantly hydrogenated isoprene monomer units and a central polymeric block containing predominantly monoalkenyl aromatic hydrocarbon monomer units and with a lubricating oil composition comprising such a polymeric VI improver. As indicated more fully hereinafter, it is important that the triblock copolymer useful as a VI improver in accordance with this invention contain from about 50 to about 82 wt % hydrogenated isoprene monomer units and from about 50 to about 18 wt % monoalkenyl aromatic hydrocarbon monomer units.

DETAILED DESCRIPTION OF THE INVENTION

As indicated supra, the present invention relates to compositions comprising triblock copolymers useful as polymeric VI improvers and to lubricating oil compositions comprising such VI improvers. The triblock copolymer VI improvers of this invention will comprise terminal polymer blocks containing predominantly hydrogenated isoprene monomer units and a central polymer block comprising predominantly one or more monoalkenyl aromatic hydrocarbon monomer units. As used herein, the recitation "predominantly" in conjugation with polymer block monomer composition shall mean that the block will comprise at least 90 wt % of the specified monomer. The polymer blocks will, preferably, be homopolymers. The triblock copolymer will contain from about 50 to about 82 wt % hydrogenated isoprene monomer units and from about 50 to about 18 wt % monoalkenyl aromatic hydrocarbon monomer units.

In general, any of the methods well known in the prior art may be used to produce the triblock copolymers which are subsequently selectively hydrogenated and which are then useful as VI improvers in the present invention. Suitable methods, then, include, but are not limited to, those described in U.S. Pat. Nos. 3,231,635; 3,265,765 and 3,322,856, the disclosure of which patents are herein incorporated by reference. In general, the triblock copolymers which may be selectively hydrogenated and rendered useful as VI improvers in accordance with the present invention may be represented by the general formula:

I-A-I wherein I is a polymeric block containing predominantly isoprene monomer units and A is a polymeric block comprising predominantly one or more monoalkenyl aromatic hydrocarbon monomer units. In general, polymers of this type can be prepared by first combining isoprene or a monomer mixture comprising predominantly isoprene in a suitable solvent and then polymerizing the isoprene or the monomer mixture comprising predominantly isoprene in the presence of an organo metallic compound particularly an organo metallic compound containing an alkali metal atom until the polymerization is substantially complete. Particularly preferred organo metallic compounds for use in preparing the triblock copolymers useful in the present invention with this sequential polymerization technique are hydrocarbon radicals bonded to a single lithium atom. Suitable hydrocarbon compounds containing a single lithium atom include unsaturated compounds such as allyllithium, methallyllithium and the like; aromatic compounds such as phenyllithium, the tolyllithiums, the xyllithiums, the napthllithiums and the like; and alkyllithiums such as methyllithium, ethyllithium, propyllithium, butyllithium, amyllithium, hexyllithium, 2-ethylhexyllithium, n-hexadecyllithium and the like. Secondarybutyllithium is a most preferred initiator for use in the present invention.

Suitable solvents useful in the preparation of the triblock copolymers include hydrocarbons such as paraffins, cycloparaffins, aromatics and alkyl-substituted aromatics containing from about 4 to about 10 carbon atoms per molecule. Suitable solvents particularly include benzene, toluene, cyclohexane, methylcyclohexane, n-butane, n-hexane, n-heptane, and the like.

Once polymerization of the first isoprene polymer block has been completed, the monoalkenyl aromatic hydrocarbon polymeric block may be formed by adding one or more monoalkenyl aromatic hydrocarbon monomers to the solution containing the living isoprene polymer blocks and continuing the polymerization until polymerization of the monoalkenyl aromatic hydrocarbon monomer is substantially complete. Suitable monoalkenyl aromatic hydrocarbon monomers include aryl-substituted olefins such as styrene, various alkyl-substituted styrenes, alkoxy-substituted styrenes, vinyl naphthalene, vinyl toluene and the like. In general, the amount of monoalkenyl aromatic hydrocarbon monomer added will be controlled such that the desired molecular weight of the monoalkenyl aromatic hydrocarbon polymer block is obtained.

Once preparation of the monoalkenyl aromatic hydrocarbon monomer polymeric block has been completed, the second terminal isoprene polymeric block can be prepared by adding additional isoprene or a monomer mixture comprising predominantly isoprene to the solution containing the living diblock copolymer prepared in the previous steps. Polymerization of the added monomer is then continued until polymerization of the added monomer is at least substantially complete. The molecular weight of the second terminal isoprene polymer block can be controlled by controlling the amount of monomer added during this third step of the triblock copolymer preparation.

The I-A-I triblock copolymers which may be subsequently hydrogenated as used as VI improvers may also be prepared by first polymerizing the monoalkenyl aromatic hydrocarbon block with an anionic initiator comprising two lithium atoms and thereafter growing the terminal polyisoprene blocks. The I-A-I triblock copolymers may further be prepared by polymerizing a first isoprene block and then a monoalkenyl aromatic hydrocarbon polymer block having a molecular weight equal to ½ that sought in the final polymer and then coupling the resulting diblock copolymer using techniques well known in the prior art.

In general, preparation of the triblock copolymers, which will be subsequently selectively hydrogenated, may be completed at a temperature within the range from about −150° C. to about 300° C. In general, the polymerization will be carried out in an inert atmosphere, preferably nitrogen, and may be carried out under pressure, for example, at a pressure within the range from about 0.5 to about 10 bars. The concentration of initiator used in the polymerization reaction may vary over a relatively wide range but will be controlled in combination with the amount of monomer used so as to produce triblock copolymers having the desired molecular weights.

In general, the isoprene polymer blocks of the triblock copolymers will have weight average molecular weights, as determined by gel permeation chromatograph (GPC), within the range from about 30,000 to about 150,000. The monoalkenyl aromatic hydrocarbon polymer blocks will have weight average molecular weights, as determined by GPC, within the range from about 15,000 to about 125,000.

The triblock copolymers produced via the methods described above will still contain metal atoms, particularly alkali metal atoms, and preferably lithium atoms when all of the monomer has been polymerized. These metal sites may be deactivated by adding water; an alcohol such as methanol ethanol isopropanol 2-ethylhexanol and the like; or a carboxylic acid such as formic acid, acetic acid and the like. Other compounds are, of course, known in the prior art to deactivate the active or living metal atom sites and any of these known compounds may also be used. Alternatively, the living triblock copolymer may simply be hydrogenated to deactivate the metal sites.

In general, the triblock copolymers, which must be selectively hydrogenated before being used as VI improvers, may be selectively hydrogenated using any of the techniques known in the prior art to be suitable for such selective hydrogenation. In general, the hydrogenation conditions employed will be sufficient to insure that at least 80%, preferably at least 95%, and most preferably at least 98% of the original olefinic unsaturation is hydrogenated. The hydrogenation conditions also will be selected so as to insure that less than about 20%, preferably less than 10% and most preferably less than 5% of the aromatic unsaturation is hydrogenated.

As indicated supra, any of the techniques known in the prior art to selectively hydrogenate the olefinic unsaturation may be used to hydrogenate the triblock copolymers of this invention. In general, these techniques involve the use of a suitable catalyst particularly a catalyst or catalyst precursor comprising a Group VI or Group VIII metal atom. Suitable catalysts are described in U.K. Patent Specification No. 1,030,306, the disclosure of which patent specification is herein incorporated by reference, and in U.S. Pat. No, 3,700,633, the disclosure of which patent is herein incorporated by reference. The process taught in U.S. Pat. No. 3,700,633 is particularly preferred for hydrogenating the triblock copolymers which are then useful as VI improvers in accordance with this invention. In this process, hydrogenation of the polymer is accomplished in the same solvent as was used during the polymerization with a catalyst comprising the reaction product of an aluminum alkyl and a nickel or cobalt carboxylate or alkoxide. In general hydrogenation is accomplished at a temperature within the range from about 25° C. to about 175° C. at a hydrogen partial pressure below about 5,000 psig, and usually within the range from about 250 to about 1,500 psig. In general, contacting times within the range from about 5 minutes to about 8 hours will be sufficient to permit the desired degree of hydrogenation. In general, the selectively hydrogenated triblock copolymer may be recovered as a crumb using known techniques or used directly as a solution.

The selectively hydrogenated triblock copolymers useful as VI improvers in this invention may be added to a variety of oils to produce improved oil compositions generally having improved viscosity index characteristics. For example, the selectively hydrogenated triblock copolymers may be added to fuel oils such as middle distillate fuels, synthetic and natural lubricating oils, crude oils and industrial oils. In general, the concentration of the selectively hydrogenated triblock copolymer in such oils may vary between wide limits with amounts within the range from about 0.05 to about 15 wt % being most common. Concentrations within the range from about 0.5 to about 2.5 wt % are most preferred. Oil compositions prepared with the selectively hydrogenated triblock copolymers useful as VI improvers in this invention may also contain other additives such as anti-corrosive additives, antioxidants, detergents, pour point depressants, one or more additional VI improvers and the like. Typical additives which are useful in the oil compositions such as those of this invention and their description will be found, for example, in U.S. Pat. Nos. 3,772,196 and 3,835,083, the disclosure of which patents are herein incorporated by reference.

PREFERRED EMBODIMENT OF THE INVENTION

In a preferred embodiment of the present invention, the terminal isoprene polymer blocks of the triblock copolymer will have a weight average molecular weight within the range from about 40,000 to about 125,000 and the monoalkenyl aromatic hydrocarbon monomer central polymer blocks will have a weight average molecular weight within the range from about 35,000 to about 85,000. In a most preferred embodiment of the present invention, a triblock copolymer wherein the monoalkenyl aromatic hydrocarbon polymer blocks are styrene homopolymers and the isoprene polymer blocks are isoprene homopolymers will be used. In the preferred embodiment, the triblock copolymer will comprise from about 55 to about 75 wt % isoprene and from about 45 to about 25 wt % monoalkenyl aromatic hydrocarbon monomer. In a most preferred embodiment, the triblock copolymer will contain from about 63 to about 72 wt % isoprene and from about 37 to about 28 wt % styrene.

Having thus broadly described the present invention, a preferred and most preferred embodiment thereof, it is believed that the invention will become even more apparent by reference to the following examples. It will be appreciated, however, that the examples are presented solely for the purposes of illustration and should not be construed as limiting the invention.

EXAMPLE 1

In this example, a selectively hydrogenated triblock copolymer comprising terminal selectively hydrogenated isoprene homopolymer blocks and a central polystyrene block was prepared using techniques well known to those skilled in the art of anionic polymerization. The polymer was prepared by sequentially polymerizing isoprene-styrene-isoprene in the presence of a s-butyllithium initiator. The weight average molecular weight of the central polystyrene block of the triblock copolymer thus produced was 66,000 as determined by GPC. The weight average molecular weight of the terminal isoprene blocks of the polymer thus produced was about 43,000, as determined by GPC. The polyisoprene/polystyrene/polyisoprene triblock copolymer was next hydrogenated so as to saturate at least 98% of the ethylenic unsaturation originally contained in the polyisoprene blocks in the presence of a catalyst prepared by combining $Ni(octoate)_2$ and $Al(Et)_3$ in cyclohexane.

EXAMPLE 2

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the polystyrene blocks was 55,000 and the weight average molecular weight of each polyisoprene block was about 43,000 as determined by GPC.

EXAMPLE 3

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 43,000 and the weight average molecular weight of each polyisoprene block was about 41,000, as determined by GPC.

EXAMPLE 4

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 110,000 and the weight average molecular weight of each polyisoprene block was about 85,000, as determined by GPC.

EXAMPLE 5

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 101,000 and the weight average molecular weight of each polyisoprene block was about 43,000, as determined by GPC.

EXAMPLE 6

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 81,000 and the weight average molecular weight of each polyisoprene block was about 61,000, as determined by GPC.

EXAMPLE 7

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 105,000 and the weight average molecular weight of each polyisoprene block was about 59,000 as determined by GPC.

EXAMPLE 8

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 79,000 and the weight average molecular weight of each polyisoprene block was about 80,000, as determined by GPC.

EXAMPLE 9

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 86,000 and the weight average molecular weight of each polyisoprene block was about 42,000, as determined by GPC.

EXAMPLE 10

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 54,000 and the weight average molecular weight of each polyisoprene block was about 83,000, as determined by GPC.

EXAMPLE 11

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 36,000 and the weight average molecular weight of each polyisoprene block was about 83,000, as determined by GPC.

EXAMPLE 12

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 25,000 and the weight average molecular weight of each polyisoprene block was about 70,000, as determined by GPC.

EXAMPLE 13

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 31,000 and the weight average molecular weight of each polyisoprene block was about 84,000, as determined by GPC.

EXAMPLE 14

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 21,000 and the weight average molecular weight of each polyisoprene block was about 79,000, as determined by GPC.

EXAMPLE 15

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the polystyrene blocks was 39,000 and the weight average molecular weight of each polyisoprene block was about 105,000 as determined by GPC.

EXAMPLE 16

In this example, a selectively hydrogenated triblock copolymer containing terminal polyisoprene blocks and a central polystyrene block was prepared using a different technique well known to those skilled in the art of anionic polymerization. The polymer in this Example was prepared by sequentially polymerizing isoprene and styrene with a s-butyllithium initiator and then coupling two living diblock copolymer to produce a triblock copolymer. The weight average molecular weight of the styrene block in the triblock copolymer thus produced was 59,000 and the weight average molecular weight of each polyisoprene block in the triblock copolymer was about 58,000, as determined by GPC.

EXAMPLE 17

In this example, a selectively hydrogenated triblock copolymer containing terminal polyisoprene blocks and a central polystyrene block was prepared using the same procedure as was used in Example 16 except that the amount of isoprene, secondary butyllithium and styrene was varied so as to produce a triblock copolymer wherein the weight average molecular weight of the styrene block was 42,000 and the weight average molecular weight of each polyisoprene block was about 112,000, as determined by GPC.

EXAMPLE 18

In this example, a selectively hydrogenated triblock copolymer containing terminal polyisoprene blocks and a central polystyrene block was prepared using the same procedure as was used in Example 16 except that the amount of isoprene, secondary butyllithium and styrene was varied so as to produce a triblock copolymer wherein the weight average molecular weight of the styrene block was 22,000 and the weight average molecular weight of each polyisoprene block was about 100,000, as determined by GPC.

EXAMPLE 19

In this example, a selectively hydrogenated triblock copolymer containing terminal polyisoprene blocks and a central polystyrene block was prepared using the same procedure as was used in Example 16 except that the amount of isoprene, secondary butyllithium and styrene was varied so as to produce a triblock copolymer wherein the weight average molecular weight of the styrene block was 9,000 and the weight average molecular weight of each polyisoprene block was about 100,000, as determined by GPC.

EXAMPLE 20

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 25,000 and the weight average molecular weight of each polyisoprene block was about 33,000 as determined by GPC.

EXAMPLE 21

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 32,000 and the weight average molecular weight of each polyisoprene block was about 43,000, as determined by GPC.

EXAMPLE 22

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 40,000 and the weight average molecular weight of each polyisoprene block was about 52,000, as determined by GPC.

EXAMPLE 23

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 47,000 and the weight average molecular weight of each polyisoprene block was about 62,000, as determined by GPC.

EXAMPLE 24

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 54,000 and the weight average molecular weight of each polyisoprene block was about 72,000, as determined by GPC.

EXAMPLE 25

In this example, a selectively hydrogenated triblock copolymer containing terminal polyisoprene blocks and a central polystyrene block was prepared using the same procedure as was used in Example 1 except that the amount of isoprene, secondary butyllithium and styrene was varied so as to produce a triblock copolymer wherein the weight average molecular weight of the styrene block was 62,000 and the weight average molecular weight of each polyisoprene block was about 81,000, as determined by GPC.

EXAMPLE 26

In this example, a diblock copolymer comprising a single polystyrene block and a single polyisoprene block was prepared. The diblock was prepared using the same procedure as was used in Example 1 except that the polymerization was stopped after polymerization of the styrene block was completed. The diblock copolymer thus prepared was then selectively hydrogenated using the same conditions as were used in Example 1. The diblock copolymer was recovered as a crumb by precipitating with an alcohol. The weight average molecular weight of the polystyrene block was about 35,000 and the weight average molecular weight of the polyisoprene block was 91,000.

EXAMPLE 27

In this Example, a diblock copolymer containing a single polyisoprene block and a single polystyrene block was prepared using the same method as was used in Example 26 except that the amount of isoprene, s-butyllithium and styrene was varied so as to produce a diblock copolymer wherein the weight average molecular weight of the polystyrene block was about 35,000 and the weight average molecular weight of the polyisoprene block was about 65,000.

EXAMPLES 28–54

In these Examples, 1.7 wt % of each of the polymers prepared in Examples 1–27 was added to an HVI 100N oil. The kinematic viscosity at 100° C. and the mechanical shear stability of each blend and the viscosity index of certain of the blends was then determined. The viscosity index was determined using ASTM D2270 and the mechanical shear stability was determined using ASTM D3945. The results for each blend as well as the weight average molecular weight of each of the polymers are summarized in the following Table:

TABLE

| Example No. | Polymer of Example No. | MW × $10^3$ | Viscosity 100° C., cSt | DIN Test % Visc. Loss | VI |
|---|---|---|---|---|---|
| 28 | 1 | 167 | 11.03 | 1.0 | 176 |
| 29 | 2 | 157 | 12.15 | 0.9 | 178 |
| 30 | 3 | 140 | 12.08 | 0.3 | 163 |
| 31 | 4 | 300 | 26.52 | 40.6 | 205 |
| 32 | 5 | 203 | 8.11 | 0.4 | 166 |
| 33 | 6 | 222 | 15.80 | 8.0 | 186 |
| 34 | 7 | 236 | 13.80 | 9.4 | 184 |
| 35 | 8 | 272 | 32.79 | 44.8 | 209 |
| 36 | 9 | 181 | 9.61 | 1.6 | 169 |
| 37 | 10 | 256 | 29.68 | 49.3 | 152 |
| 38 | 11 | 239 | 18.13 | 35.2 | 79 |
| 39 | 12 | 176 | 14.20 | 16.6 | 90 |
| 40 | 13 | 211 | 16.80 | 35.9 | 177 |
| 41 | 14 | 200 | 16.23 | 29.9 | 85 |
| 42 | 15 | 291 | 24.63 | 45.5 | 80 |
| 43 | 16 | 195 | 18.23 | 14.0 | 178 |
| 44 | 17 | 298 | 20.11 | 40.5 | 110 |
| 45 | 18 | 248 | 19.50 | 39.2 | 106 |
| 46 | 19 | 235 | 21.31 | 43.4 | 184 |
| 47 | 20 | 100 | 9.80 | 0 | — |
| 48 | 21 | 130 | 12.69 | 3.0 | — |
| 49 | 22 | 160 | 15.98 | 11.9 | — |
| 50 | 23 | 190 | 19.62 | 21.7 | — |
| 51 | 24 | 220 | 23.60 | 32.0 | — |
| 52 | 25 | 250 | 27.80 | 42.8 | — |
| 53 | 26 | 140 | 32.50 | 54.8 | — |
| 54 | 27 | 101 | 16.20 | 8.1 | — |

As will be apparent from the data summarized in the foregoing Table, the triblock copolymers lose a significantly lower percentage of viscosity in the DIN test as the molecular weight increases than do the diblock copolymers (cf., e.g., Examples 30 and 53; 47 and 54 and 42 and 53). As will also be apparent from the data summarized in the preceding Table, those polymers containing lower molecular weight polystyrene blocks are, generally, less effective as VI improvers (cf., e.g., Examples 39 and 41 and 38 and 42).

EXAMPLES 55–81

In these examples the selectively hydrogenated triblock copolymers produced in Examples 1–27 were used as VI improvers in a 10W-40 multigrade lubricating oil composition. The base stock used in the preparation of the multigrade lubricating oil composition was a blend of an HVI 100N oil and an HVI 250N oil. The amount of HVI 250N oil was varied so as to provide a lubricating oil composition having a viscosity within the range from about 32 to about 35 poise as measured in the cold cranking simulator (see SAE J-300, Apr. 84) at −20° C. The multigrade lubricating oil compositions prepared in these examples also contained 7.75 wt % of a commercially available additive package (Lubrizol 7573) and 0.3 wt % Acryloid 160. The kinematic viscosities at 100° C., the viscosity index, the cold cranking simulator (CCS) viscosity at −20° C., the high temperature high shear rate viscosity at 150° C. with a shear rate of $1 \times 10^6$ seconds$^{-1}$ using the tapered bearing simulator (TBS) according to ASTM D4683 and the mechanical shear stability using the DIN test according to ASTM D3945 were determined for each lubricating oil composition. The polymer used in each Example, the amount thereof added to the oil composition, the percent of HVI 250N oil used in the lubricating oil composition and all other results are summarized in the table below:

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A lubricating oil composition comprising a triblock copolymer containing terminal hydrogenated polyisoprene blocks and a central polymeric block containing predominantly monoalkenyl aromatic hydrocarbon monomer units.

2. The lubricating oil composition of claim 1 wherein the weight average molecular weight of the hydrogenated isoprene blocks is within the range from about 30,000 to about 150,000 and the weight average molecular weight of the monoalkenyl aromatic hydrocarbon polymer block is within the range from about 15,000 to

| Example No. | Polymer of Example No. | MW × 10$^{-3}$ | % wt | % HVI 250 N | Kinematic Vis., 100° C. cSt | CCS −20° C. cP | TBS 150° C. Cp | DIN Test, % Vis Loss |
|---|---|---|---|---|---|---|---|---|
| 55 | 1  | 167 | 1.67 | 25.64 | 14.68 | 3336 | 3.92 | 1.0 |
| 56 | 2  | 157 | 1.52 | 26.64 | 14.58 | 3336 | 3.95 | 0.9 |
| 57 | 3  | 140 | 1.46 | 27.05 | 14.56 | 3361 | 3.90 | 0.3 |
| 58 | 4  | 300 | 1.00 | 30.51 | 13.99 | 3307 | 3.37 | 27.3 |
| 59 | 5  | 203 | 2.50 | 20.11 | 14.02 | 3251 | 4.24 | 0.1 |
| 60 | 6  | 222 | 1.30 | 28.11 | 14.47 | 3307 | 3.68 | 6.6 |
| 61 | 7  | 236 | 1.45 | 22.64 | 14.40 | 3072 | 3.58 | 6.3 |
| 62 | 8  | 272 | 0.93 | 25.61 | 14.12 | 3106 | 3.46 | 29.5 |
| 63 | 9  | 181 | 2.10 | 22.78 | 14.20 | 3299 | 4.18 | 1.0 |
| 64 | 10 | 256 | 0.85 | 31.11 | 14.69 | 3388 | 3.62 | 33.6 |
| 65 | 11 | 239 | 1.00 | 26.35 | 14.45 | 3275 | 3.91 | 27.3 |
| 66 | 12 | 176 | 1.25 | 21.34 | 14.40 | 3103 | 3.87 | 18.9 |
| 67 | 13 | 211 | 1.08 | 22.16 | 14.50 | 3280 | 3.81 | 27.2 |
| 68 | 14 | 200 | 1.10 | 24.29 | 14.43 | 3243 | 3.84 | 24.2 |
| 69 | 15 | 291 | 0.87 | 25.58 | 14.55 | 3255 | 3.72 | 35.1 |
| 70 | 16 | 195 | 1.17 | 28.98 | 14.52 | 3345 | 3.77 | 12.3 |
| 71 | 17 | 298 | 1.00 | 24.84 | 14.53 | 3231 | 3.68 | 32.8 |
| 72 | 18 | 248 | 0.95 | 26.64 | 14.57 | 3388 | 3.85 | 28.2 |
| 73 | 19 | 235 | 0.90 | 23.08 | 14.39 | 3414 | 3.81 | 29.5 |
| 74 | 20 | 100 | 1.59 | 27.60 | 14.50 | 3350 | 4.12 | 0 |
| 75 | 21 | 130 | 1.37 | 28.30 | 14.50 | 3350 | 3.98 | 11.0 |
| 76 | 22 | 160 | 1.22 | 28.30 | 14.50 | 3350 | 3.88 | 20.2 |
| 77 | 23 | 190 | 1.11 | 28.30 | 14.50 | 3350 | 3.78 | 27.3 |
| 78 | 24 | 220 | 1.02 | 28.00 | 14.50 | 3350 | 3.68 | 32.7 |
| 79 | 25 | 250 | 1.00 | 27.60 | 14.50 | 3350 | 3.57 | 36.7 |
| 80 | 26 | 140 | 0.75 | 30.00 | 13.94 | 3174 | 3.22 | 38.0 |
| 81 | 27 | 101 | 1.10 | 30.00 | 14.10 | 3225 | 3.40 | 14.0 |

From the data summarized in the foregoing Table, it is apparent that when molecular weight is taken into consideration, the VI improvers of this invention (Examples 1-25) exhibit a better balance of thickening efficiency, mechanical shear stability and HTHSR viscosity when compared to the prior art polymer VI improvers (Examples 26-27). As will also be apparent from the data summarized in the preceding Table, the VI improvers of this invention, generally, give oil compositions having higher HTHSR viscosities than the prior art diblock copolymers.

about 125,000.

3. The lubricating oil composition of claim 2, wherein said monoalkenyl aromatic hydrocarbon is styrene.

4. The lubricating oil composition of claim 1 wherein the weight average molecular weight of the hydrogenated isoprene blocks is within the range of from about 40,000 to about 125,000 and the weight average molecular weight of the monoalkenyl aromatic hydrocarbon polymer block is within the range from about 35,000 to about 85,000.

5. The lubricating oil composition of claim 4 wherein said monoalkenyl aromatic hydrocarbon is styrene.

* * * * *